US012784274B2

(12) United States Patent
Kobori et al.

(10) Patent No.: US 12,784,274 B2
(45) Date of Patent: Nov. 3, 2026

(54) JOINT POSE ESTIMATION METHOD, JOINT POSE ESTIMATION SYSTEM, AND JOINT POSE ESTIMATION PROGRAM

(71) Applicant: TOYOTA JIDOSHA KABUSHIKI KAISHA, Aichi-ken (JP)

(72) Inventors: Norimasa Kobori, Nakano-ku (JP); Jira Jindalertudomdee, Setagaya-ku (JP); Quan Kong, Toshima-ku (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 214 days.

(21) Appl. No.: 18/764,177

(22) Filed: Jul. 4, 2024

(65) Prior Publication Data

US 2025/0014219 A1 Jan. 9, 2025

(30) Foreign Application Priority Data

Jul. 7, 2023 (JP) ................................ 2023-112465

(51) Int. Cl.
*G06T 7/73* (2017.01)

(52) U.S. Cl.
CPC ...... *G06T 7/75* (2017.01); *G06T 2207/20076* (2013.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2008/0152218 | A1 | 6/2008 | Okada | |
| 2014/0219550 | A1* | 8/2014 | Popa | G06V 20/42 382/154 |
| 2015/0036879 | A1 | 2/2015 | Shiozaki et al. | |

(Continued)

FOREIGN PATENT DOCUMENTS

| | | | |
|---|---|---|---|
| JP | 4709723 | B2 | 6/2011 |
| JP | 5555207 | B2 | 7/2014 |
| JP | 6433149 | B2 | 12/2018 |

OTHER PUBLICATIONS

Ionescu et al., "Human3.6M: Large Scale Datasets and Predictive Methods for 3D Human Sensing in Natural Environments," IEEE Transactions on Pattern Analysis and Machine Intelligence, 2014 (Year: 2014).*

(Continued)

*Primary Examiner* — Michelle M Koeth
(74) *Attorney, Agent, or Firm* — HAUPTMAN HAM, LLP

(57) ABSTRACT

According to the method of the present disclosure, a two-dimensional joint pose of a target object belonging to an articulated object is estimated from an image of the target object by using a model. A query pose is generated by removing a joint whose confidence score is lower than a threshold from the two-dimensional joint pose of the target object. A sample two-dimensional joint pose closest to the query pose is obtained from a database in which a plurality of sample two-dimensional joint poses is registered for each basic joint pose of a sample articulated object. The two-dimensional joint pose of the target object is corrected by replacing the joint whose confidence score is lower than the threshold with a corresponding joint of the sample two-dimensional joint pose closest to the query pose.

7 Claims, 5 Drawing Sheets

(56) References Cited

U.S. PATENT DOCUMENTS

| | | | | |
|---|---|---|---|---|
| 2024/0290034 | A1* | 8/2024 | Fang | G06T 17/00 |
| 2024/0296582 | A1* | 9/2024 | Ramani | G06V 10/454 |

OTHER PUBLICATIONS

Gregory Rogez et al., "LCR-Net++: Multi-person 2D and 3D Pose Detection in Natural Images", Jan. 13, 2019, 15pp.
Rina Tanaka et al., "3 DCG Avatar Motion Generation by Replacement of Low-Reliability Posture Information", Information Processing Society of Japan Research Report, Graphics and CAD Study Group Report, Jun. 28, 2014, vol. 2014-CG-155, No. 7, Japan, 6pp.
Sen Yang et al., "TransPose: Keypoint Localization via Transformer", Dec. 28, 2020, 15pp.

* cited by examiner

JOINT POSE ESTIMATION METHOD, JOINT POSE ESTIMATION SYSTEM, AND JOINT POSE ESTIMATION PROGRAM

CROSS-REFERENCE TO RELATED APPLICATION

The present application claims priority under 35 U.S.C. § 119 to Japanese Patent Application No. 2023-112465, filed Jul. 7, 2023, the contents of which application are incorporated herein by reference in their entirety.

BACKGROUND

Field

The present disclosure relates to a technique suitable for use in estimating a joint pose of an object including a human.

Background Art

JP6433149B discloses a prior art for estimating a pose of an articulated object. According to the prior art, first, joint position candidates of the object are calculated from a range image including the object. Next, the consistency of the arrangement of the joint position candidates is evaluated based on tolerance information for arrangement relationship between joints in an articulated object model corresponding to the object. Then, based on the evaluation, the joint positions of the object are determined from the joint position candidates to estimate the pose of the object.

However, occlusion and truncation are not considered in the above-mentioned prior art. Therefore, in a difficult situation including occlusion or truncation, the estimation accuracy of the joint position may be reduced.

JP4709723B and JP5555207B can be exemplified as documents showing the technical level of the technical field related to the present disclosure in addition to JP6433149B.

SUMMARY

The present disclosure has been made in view of the above-described problems, and an object thereof is to provide a technique capable of accurately estimating a two-dimensional joint pose of an object even in a difficult situation including occlusion and truncation.

The present disclosure provides a joint pose estimation technique to achieve the above object. The joint pose estimation technique according to the present disclosure includes a joint pose estimation method, a joint pose estimation system, and a joint pose estimation program.

The joint pose estimation method of the present disclosure includes the following first to fourth steps. The first step is a step of estimating a two-dimensional joint pose of a target object belonging to an articulated object represented by a plurality of joints from an image of the target object. A two-dimensional joint pose model is used to estimate the two-dimensional joint pose. The two-dimensional joint pose model is a model configured to output a two-dimensional joint pose of an articulated object and a confidence score of estimated position of each joint upon an input of an image of the articulated object. The second step is a step of generating a query pose by removing a joint whose confidence score is lower than a threshold from the two-dimensional joint pose of the target object. The third step is a step of obtaining a sample two-dimensional joint pose closest to the query pose from a database in which a plurality of sample two-dimensional joint poses is registered for each basic joint pose of a sample articulated object. The fourth step is a step of correcting the two-dimensional joint pose of the target object by replacing the joint whose confidence score is lower than the threshold with a corresponding joint of the sample two-dimensional joint pose closest to the query pose.

The joint pose estimation system of the present disclosure comprises at least one processor and a program memory coupled to the at least one processor and storing a plurality of instructions. The plurality of instructions is configured to cause the at least one processor to execute the following first to fourth processes. The first process is a process of estimating a two-dimensional joint pose of a target object belonging to an articulated object represented by a plurality of joints from an image of the target object by using a two-dimensional joint pose model. The second process is a process of generating a query pose by removing a joint whose confidence score is lower than a threshold from the two-dimensional joint pose of the target object. The third process is a process of obtaining a sample two-dimensional joint pose closest to the query pose from a database in which a plurality of sample two-dimensional joint poses is registered for each basic joint pose of a sample articulated object. The fourth process is a process of correcting the two-dimensional joint pose of the target object by replacing the joint whose confidence score is lower than the threshold with a corresponding joint of the sample two-dimensional joint pose closest to the query pose.

The joint pose estimation program according to the present disclosure comprises a plurality of instructions executable by at least one processor. The plurality of instructions is configured to cause the at least one processor to perform the following first to fourth processes. The first process is a process of estimating a two-dimensional joint pose of a target object belonging to an articulated object represented by a plurality of joints from an image of the target object by using a two-dimensional joint pose model. The second process is a process of generating a query pose by removing a joint whose confidence score is lower than a threshold from the two-dimensional joint pose of the target object. The third process is a process of obtaining a sample two-dimensional joint pose closest to the query pose from a database in which a plurality of sample two-dimensional joint poses is registered for each basic joint pose of a sample articulated object.

The fourth process is a process of correcting the two-dimensional joint pose of the target object by replacing the joint whose confidence score is lower than the threshold with a corresponding joint of the sample two-dimensional joint pose closest to the query pose. The joint pose estimation program according to the present disclosure may be stored in a non-transitory computer-readable storage medium or may be provided via a network.

According to the joint pose estimation technique of the present disclosure, among the joints constituting the two-dimensional joint pose estimated using the two-dimensional joint pose model, the joint having a high confidence score of the estimated position maintains the original position, and only the joint having a low confidence score of the estimated position is replaced with the corresponding joint of the closest sample two-dimensional joint pose. This makes it possible to accurately estimate the two-dimensional joint pose of the target object even in a difficult situation such as occlusion or truncation.

DETAILED DESCRIPTION

Figure 1:
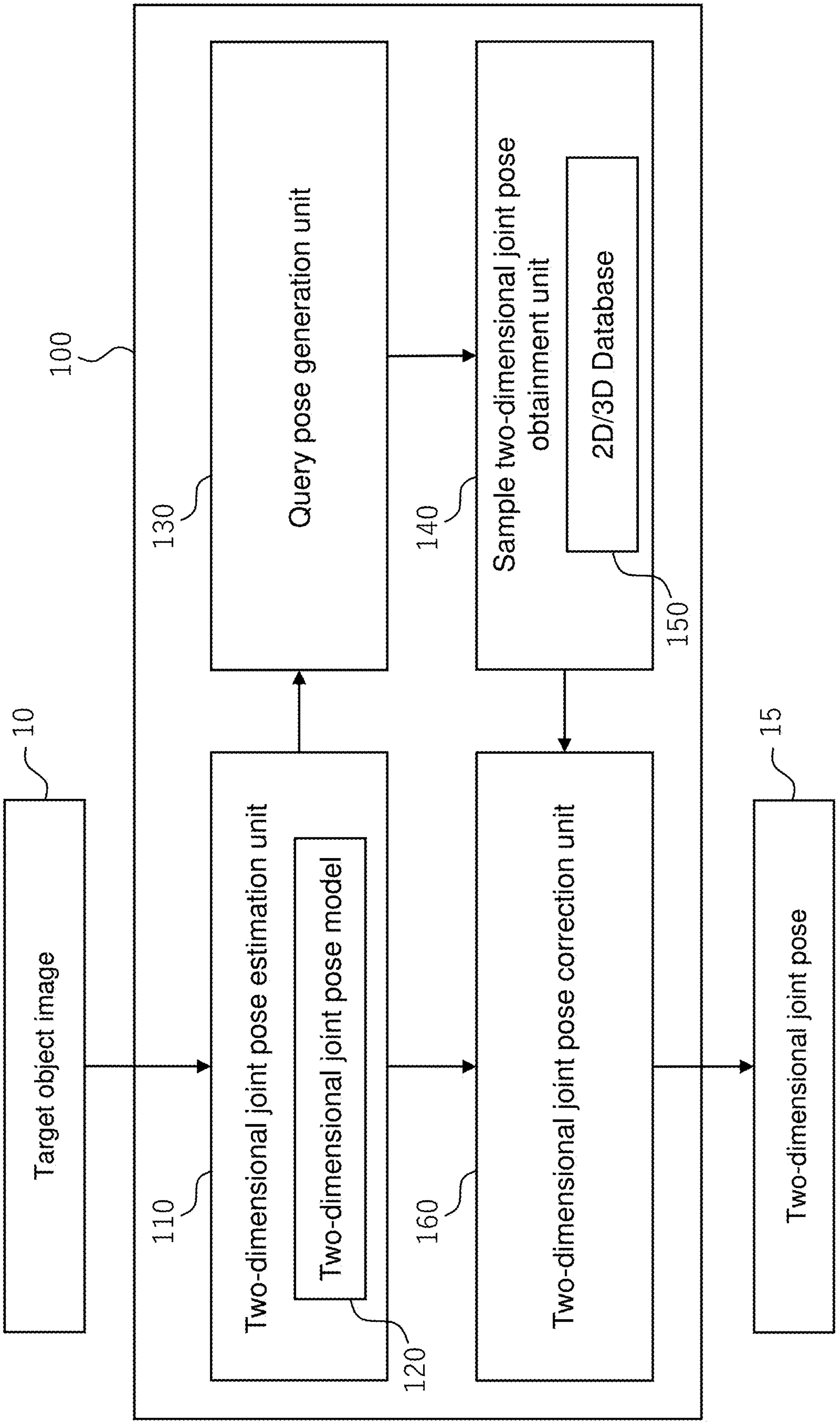
FIG. 1 is a diagram illustrating a configuration of a system for implementing a joint pose estimation method according to an embodiment of the present disclosure.

FIG. 1 is a diagram illustrating a configuration of a system for implementing a joint pose estimation method according to an embodiment of the present disclosure, that is, a joint pose estimation system. The joint pose estimation system 100 according to the present embodiment is a system that estimates a two-dimensional (2D) joint pose 15 of a target object from an image 10 of the target object. The target object is an articulated object whose joint pose is to be estimated. The articulated object includes not only a human but also all objects that can be expressed by a plurality of joints, such as a vehicle, a desk drawer, and scissors. The joint pose estimation system 100 according to this embodiment includes a 2D joint pose estimation unit 110, a query pose generation unit 130, a sample 2D joint pose obtainment unit 140, and a 2D joint pose correction unit 160.

First, the 2D joint pose estimation unit 110 will be described. A 2D joint pose model 120 is used to estimate the 2D joint pose estimate. The 2D joint pose model 120 is a model (neural network) used for estimating a 2D joint pose of an articulated object. The 2D joint pose model 120 is prepared for each type of target object. In the following description, it is assumed that the target object is a human, and the 2D joint pose model 120 has been learned for estimating the 2D joint pose of the human.

As the 2D joint pose model 120, a joint position model based on a top-down approach is particularly effective. The architectures Transpose, AlphaPose, VitPose, RMPE, and Location-free Human Pose Estimation described in the following papers are examples of top-down joint position models that can be used as the 2D joint pose model 120.

(1) TransPose: Sen Yang, Zhibin Quan, Mu Nie, Wankou Yang. "TransPose: Keypoint Localization via Transformer" arXiv: 2012.14214 [cs.CV] 1 Sep. 2021

(2) AlphaPose: Hao-Shu Fang, Jiefeng Li, Hongyang Tang, Chao Xu, Haoyi Zhu, Yuliang Xiu, Yong-Lu Li, and Cewu Lu, "AlphaPose: Whole-Body Regional Multi-Person Pose Estimation and Tracking in Real-Tim" arXiv: 2211.03375v1 [cs. CV] 7 Nov. 2022

(3) VitPose: Yufei Xu, Jing Zhang, Qiming Zhang, Dacheng Tao, "ViTPose: Simple Vision Transformer Baselines for Human Pose Estimation" arXiv: 2204.12484v3 [cs. CV] 13 Oct. 2022

(4) RMPE: Hao-Shu Fang1, Shuqin Xie, Yu-Wing Tai, Cewu Lu, "RMPE: Regional Multi-Person Pose Estimation" arXiv: 1612.00137 [cs. CV] 4 Feb. 2018

(5) Location-free Human Pose Estimation: Xixia Xu, Yingguo Gao, Ke Yan, Xue Lin, Qi Zou, "Location-free Human Pose Estimation" arXiv: 2205.12619 [cs.CV] 25 May 2022

Figure 2:
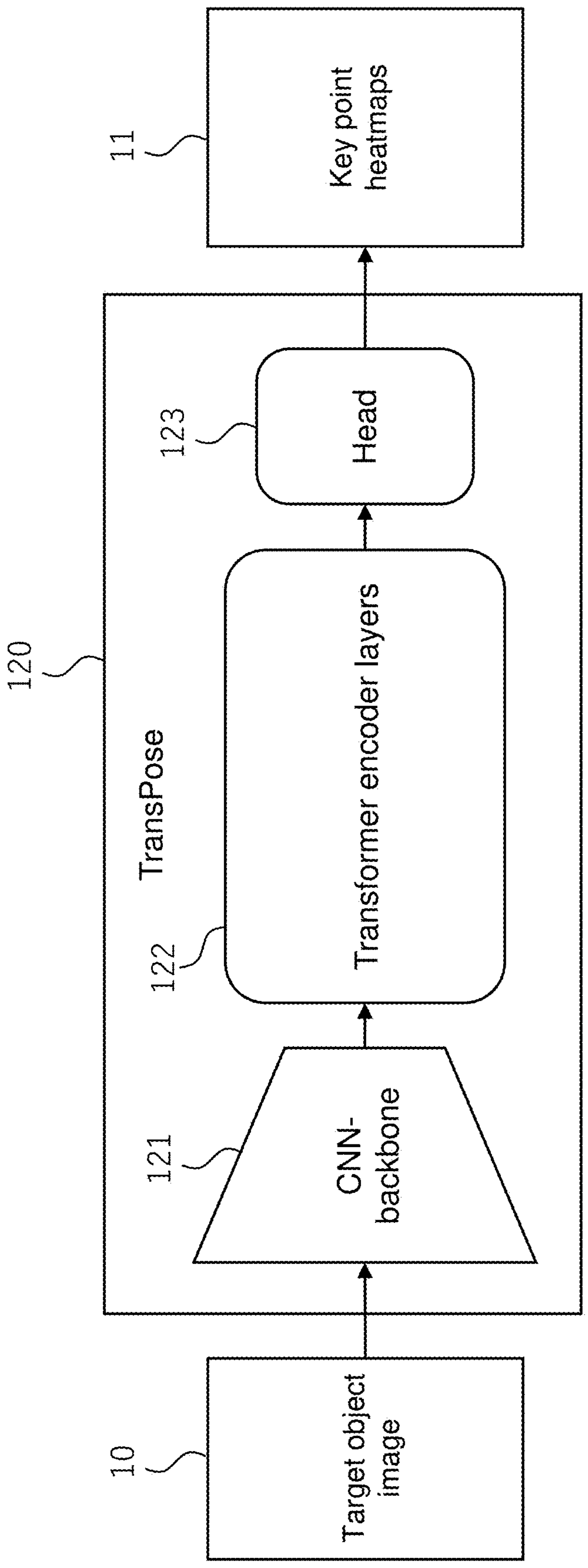
FIG. 2 is a diagram illustrating an example of a two-dimensional joint pose model.

FIG. 2 illustrates an example of a 2D joint pose model 120. In the example shown in FIG. 2, the Transpose architecture is used as the 2D joint pose model 120. The Transpose architecture includes a CNN backbone 121, a multi-layered transformer encoder layer 122, and a head 123. By inputting the image 10 of the target human into the CNN backbone 121, a plurality of keypoint heat maps 11 is output from the head 123. The key point heat map 11 is output for each estimated joint. In each key point heat map 11, the estimated position of the joint of the target human and the confidence score thereof are indicated by a heat map.

According to the 2D joint pose model 120 such as the Transpose architecture, the joint position of an articulated object can be estimated very accurately under normal circumstances. A normal situation means a situation without occlusion or truncation. However, under difficult conditions including occlusion and truncation, the accuracy of joint position estimation by the 2D joint pose model 120 is reduced.

As illustrated in FIG. 2, the 2D joint pose model 120 is configured to output a confidence level of the estimated position for each joint of the target human. When occlusion (including self-occlusion in which a joint is hidden by its own body) or truncation does not occur, the positions of all joints are estimated with high confidence. On the other hand, in a situation where occlusion or truncation occurs, the estimated positions of some joints have a confidence score that is clearly lower than that of the other joints. In other words, even in a situation in which occlusion or truncation occurs, position estimation is performed with high certainty for many joints.

Here, a sample of the articulated object to which the target belongs is defined as a sample articulated object. Although the joint poses that the sample articulated object can take are infinite, they can be three dimensionally classified into a finite number of basic joint poses. The joint pose of the target object corresponds to any of the basic joint poses of the sample articulated objects. Therefore, even if a part is hidden on the image due to occlusion or truncation, if the basic joint pose of the sample articulated object corresponding to the joint pose of the target human is known, it is possible to estimate the correct 2D joint pose of the target object from the basic joint pose with high accuracy.

In the joint pose estimation method according to the present embodiment, a large number of sample 2D joint poses with different viewpoints are prepared for one basic joint pose by projecting the basic joint pose of the sample articulated object onto a plane from various directions. Each sample 2D joint pose is registered in the database in association with the corresponding basic joint pose. In the joint pose estimation method according to the present embodiment, a query pose generated from an output of the 2D joint pose model 120 is used as query information for searching the database.

The query pose is generated by the query pose generation unit 130 shown in FIG. 1. The query pose generation unit 130 generates a query pose from the 2D joint pose (hereinafter referred to as an estimated 2D joint pose) of the target human estimated by the 2D joint pose estimation unit 110. The 2D joint pose estimation unit 110 outputs the estimated 2D joint pose of the target human and the confidence score of the estimated value of each joint in the estimated 2D joint pose. The query pose generation unit 130 removes joints whose confidence scores are less than a threshold value from the estimated 2D joint pose, and generates a 2D joint pose including only joints whose confidence scores are equal to or greater than the threshold value as a query pose. The query pose generated in this way has high information accuracy as query information.

The query pose generated by the query pose generation unit 130 is sent to the sample 2D joint pose obtainment unit 140. The sample 2D joint pose obtaining unit 140 includes a 2D/3D database 150. In the 2D/3D database 150, a three-dimensional (3D) pose representing a basic articulated pose of a sample articulated object and a 2D pose representing a sample 2D articulated pose are registered. Each piece of 3D pose data is associated with corresponding 2D pose data. For example, 100 sets of 3D pose information are registered in the 2D/3D database 150. For example, in the 2D/3D database 150, 70 sets of 2D pose information are registered for one set of 3D pose information, that is, a total of 7000 sets of 2D pose information are registered. The sample 2D joint pose obtaining unit 140 searches the 2D/3D database 150 using the query pose as query information, and obtains a sample 2D joint pose closest to the query pose from the 2D/3D database 150.

Figure 3:
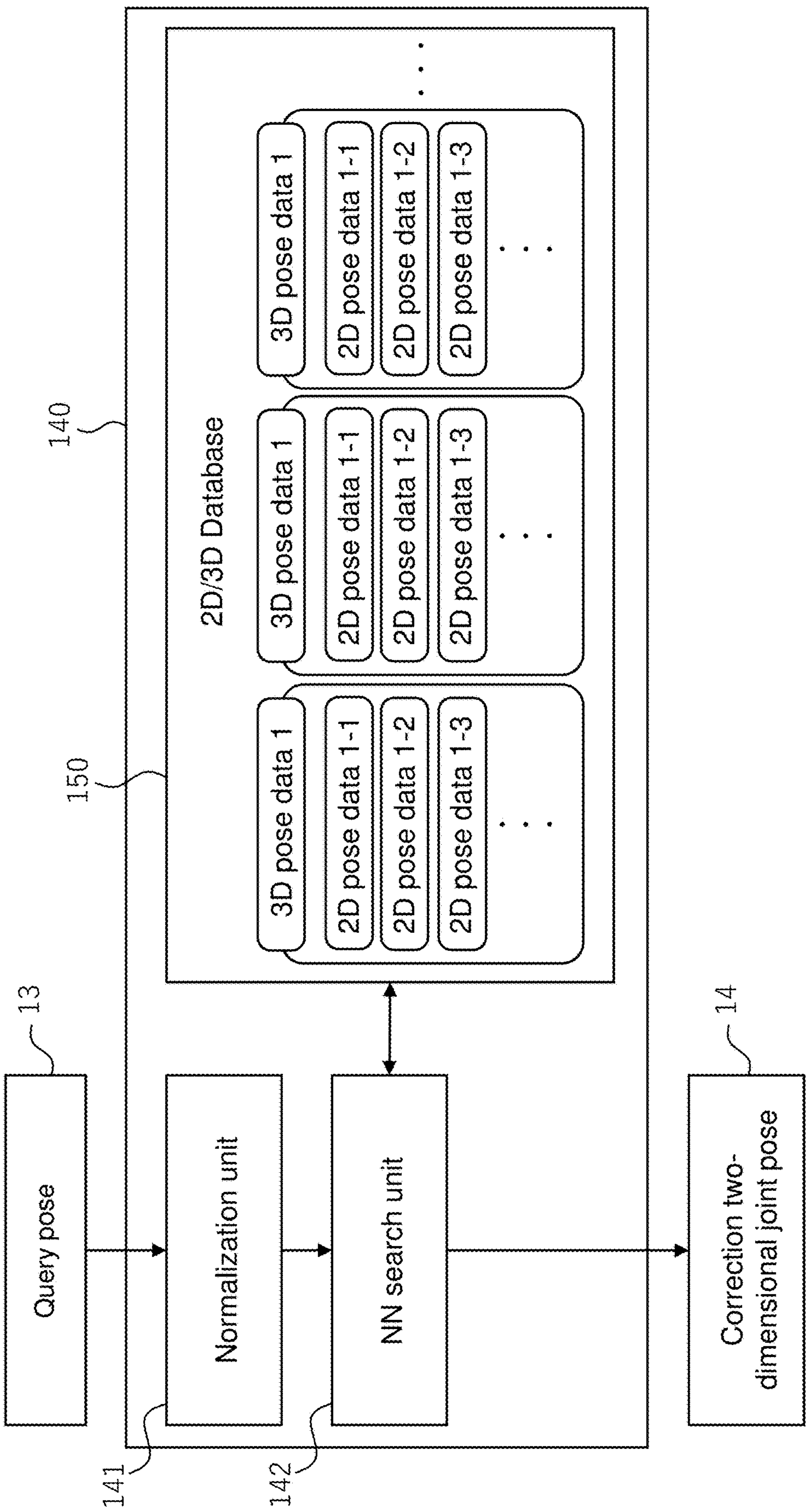
FIG. 3 is a diagram illustrating a sample two-dimensional joint pose obtainment unit.

FIG. 3 is a diagram illustrating the details of the sample 2D joint pose obtainment unit 140. In addition to the 2D/3D database 150, the sample 2D joint pose obtaining unit 140 includes a normalizing unit 141 and a searching unit 142. The normalization unit 141 normalizes the query pose 13 to eliminate the influence of the size of the target human in the image or the body shape of the target human on the search. The searching unit 142 searches the 2D/3D database 150 according to the normalized query pose 13. A nearest neighbor search is used as a search method. As a result of the nearest neighbor search, a sample 2D joint pose closest to the query pose 13 is obtained. At the same time, the basic joint pose related to the query pose 13 can also be obtained. In the example shown in FIG. 3, when the data of the sample 2D joint pose closest to the query pose 13 is the 2D pose data 2-2, the corresponding 3D pose data 2 is obtained as the data of the basic joint pose.

The sample 2D joint pose obtained by the sample 2D joint pose obtainment unit 140 is used to correct the estimated 2D joint pose obtained by the 2D joint pose estimation unit 110. Hereinafter, the sample 2D joint pose used for correcting the estimated 2D joint pose is referred to as a correction 2D joint pose 14. The correction of the estimated 2D joint pose is performed by the 2D joint pose correction unit 160 shown in FIG. 1. The 2D joint pose correcting unit 160 corrects the estimated 2D joint pose by replacing only a joint whose confidence score of the estimated position is less than a threshold value with the joint corresponding to the correction 2D joint pose while maintaining the original position of the joint whose confidence score of the estimated position is high.

The position of each joint in the correction 2D joint pose is a natural joint position corresponding to a basic joint pose that the object can actually take. By correcting only a joint having a low confidence score of an estimated position to such a natural position while maintaining the original position of a joint having a high confidence score of an estimated position in the estimated 2D joint pose, the probability of the estimated 2D joint pose as a whole is improved. By performing such correction, it is possible to estimate a correct 2D joint pose of the target human with high accuracy even if a part of the target human is hidden by occlusion or truncation on the original image 10. The joint pose estimation system 100 outputs the estimated 2D joint pose corrected by the 2D joint pose correction unit 160 as the 2D joint pose 15 of the target human.

Figure 4:
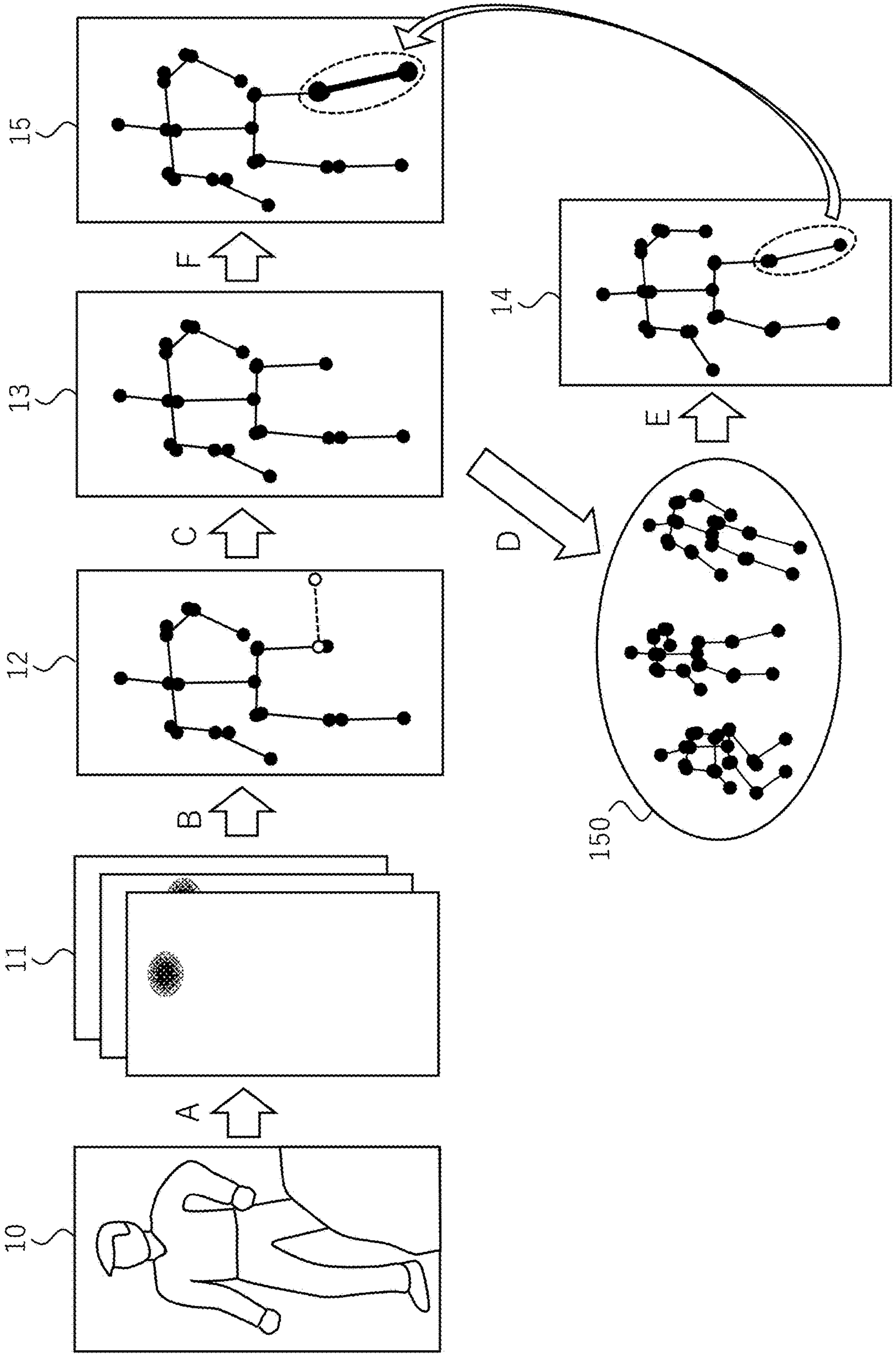
FIG. 4 is a diagram showing a specific flow of a joint pose estimation method according to an embodiment of the present disclosure.

Next, a specific flow of the joint pose estimation method performed by the joint pose estimation system 100 will be described with reference to FIG. 4. In the following example, it is assumed that the Transpose architecture is used as the 2D joint pose model 120.

In step A, in the image 10 of the target human input to the 2D joint pose model 120, the left leg of the target human is hidden by an obstacle and is not shown. In other words, occlusion occurs in the image 10. A key point heat map 11 corresponding to the image 10 is output from the 2D joint pose model 120.

In step B, an estimated 2D joint pose 12 is created from the keypoint heat map 11. Each joint of the estimated 2D joint pose 12 is provided with data indicating the confidence score of the estimated position. In the example shown in FIG. 4, a black circle constituting the estimated 2D joint pose 12 indicates a joint whose confidence score of the estimated position is equal to or greater than a threshold value, and a white circle indicates a joint whose confidence score of the estimated position is less than the threshold value.

In step C, a query pose 13 is generated by removing from the estimated 2D joint pose 12 those joints whose estimated position confidence is less than a threshold.

In step D, the 2D/3D database 150 is searched by nearest neighbor search using the normalized query pose 13 as query information.

In step E, the sample 2D joint pose obtained by searching the 2D/3D database 150 is obtained as the correction 2D joint pose 14. At this time, a 3D basic joint pose most related to the query pose 13 may be obtained together with the correction 2D joint pose 14.

In step F, among the joints constituting the estimated 2D joint pose 12, the joint whose confidence score is less than the threshold value, that is, the joint removed in the query pose 13 is replaced with the corresponding joint in the correction 2D joint pose 14. As a result, the 2D joint pose 15 is obtained which is estimated with high accuracy not only for the in the image 10 among the joints of the target human but also the joint position of the left foot hidden by the obstacle.

Figure 5:
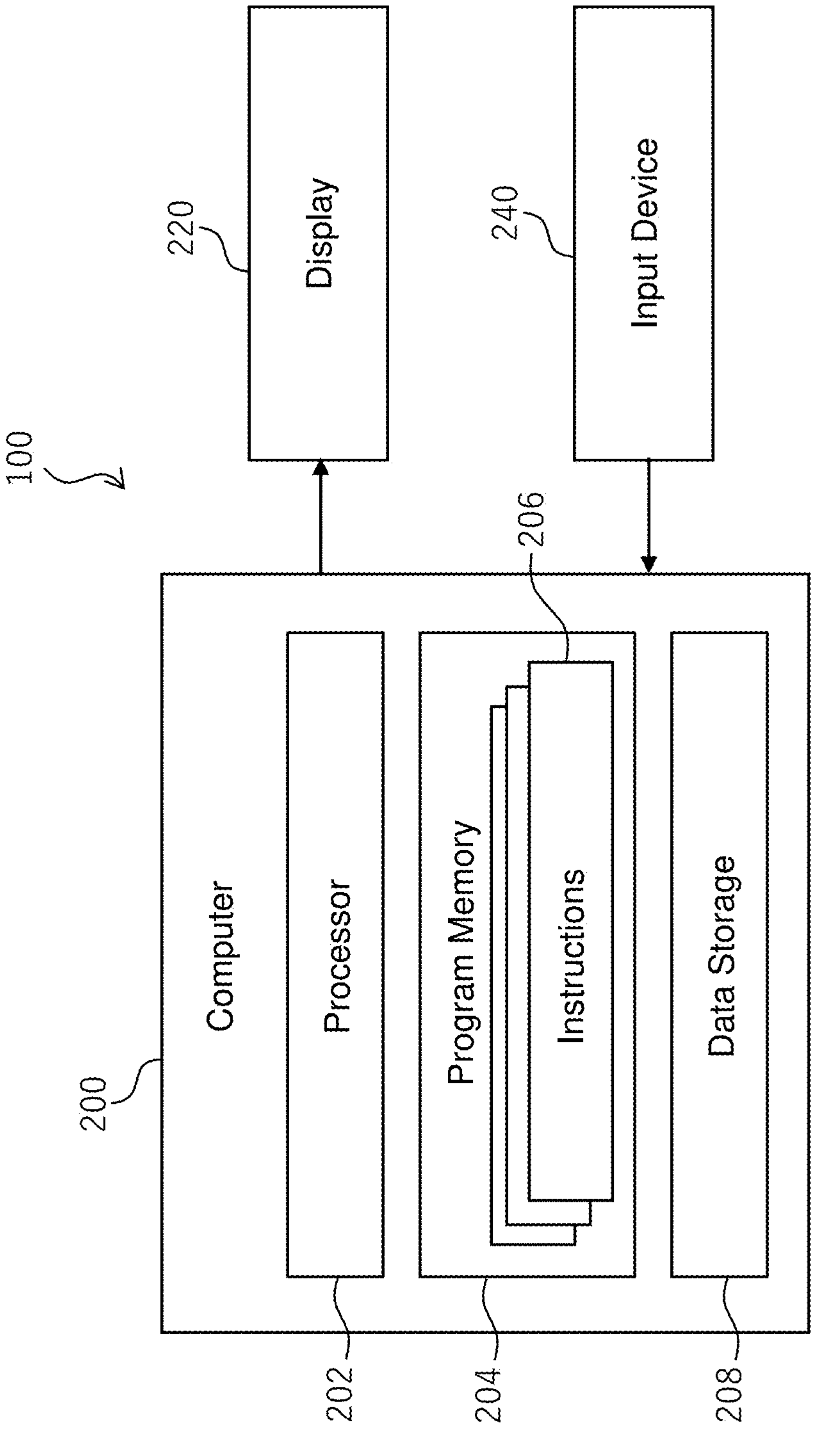
FIG. 5 is a diagram illustrating an example of a hardware configuration of a joint pose estimation system according to an embodiment of the present disclosure.

Finally, an example of a hardware configuration of the joint pose estimation system 100 according to the present embodiment will be described with reference to FIG. 5.

The joint pose estimation system 100 includes a computer 200, a display device 220, and an input device 240. The computer 200 comprises a processor 202, a program memory 204 and a data storage 208. Processor 202 is coupled to program memory 204 and data storage 208.

The program memory 204 stores a plurality of executable instructions 206. The data storage 208 is, for example, a flash memory, an SSD, or an HDD, or a hard disk drive (HDD), and stores the image 10 and data required to execute the instructions 206. A portion of data storage 208 also comprises a 2D/3D database 150.

Instructions 206 comprise a joint pose estimation program. When some or all of the instructions 206 are executed by the processor 202, the functions of the 2D joint pose estimation unit 110, the query pose generation unit 130, the sample 2D joint pose obtainment unit 140, and the 2D joint pose correction unit 160 are implemented in the computer 200.

The display device 220 displays a calculation result by the computer 200. The input device 240 is, for example, a keyboard or a mouse, and receives an operation on the computer 200. The joint pose estimation system 100 may be configured by a plurality of computers connected via a network or may be configured by a server on the Internet.

What is claimed is:

1. A joint pose estimation method, comprising:

estimating a two-dimensional joint pose of a target object from an image of the target object by using a model, the target object belonging to an articulated object represented by a plurality of joints, and the model being configured to output a two-dimensional joint pose of the articulated object and a confidence score of estimated position of each joint upon an input of an image of the articulated object;

removing a joint whose confidence score is lower than a threshold, wherein the confidence score calculated for a truncated joint is lower than that of non-truncated joints, and wherein the truncated joint is one that is outside an angle of view of the image of the target object;

generating a query pose from joints of the two-dimensional joint pose whose confidence scores are greater than or equal to the threshold;

obtaining a sample two-dimensional joint pose closest to the query pose from a database in which a plurality of sample two-dimensional joint poses is registered for each basic joint pose of a sample articulated object;

correcting the two-dimensional joint pose of the target object to a two-dimensional joint pose in which a truncated joint is complemented by replacing the joint whose confidence score is lower than the threshold with a corresponding joint of the sample two-dimensional joint pose closest to the query pose; and previous to the obtaining, registering in the database (1) three-dimensional pose data representing each basic joint pose of a sample articulated object and (2) two-dimensional pose data representing the plurality of sample two-dimensional joint poses, and associating the three-dimensional pose data and the two-dimensional pose data with each other, wherein the obtaining includes searching the database with the query pose.

2. The joint pose estimation method according to claim 1, further comprising obtaining a basic joint pose most related to the query pose from the database.

3. The joint pose estimation method according to claim 2, wherein the basic joint pose is a three-dimensional joint pose.

4. A joint pose estimation system comprising:

at least one processor; and a program memory coupled to the at least one processor, the program memory storing a plurality of instructions configured to cause the at least one processor to execute:

estimating a two-dimensional joint pose of a target object from an image of the target object by using a model, the target object belonging to an articulated object represented by a plurality of joints, and the model being configured to output a two-dimensional joint pose of the articulated object and a confidence score of estimated position of each joint upon an input of an image of the articulated object;

removing a joint whose confidence score is lower than a threshold, wherein the confidence score calculated for a truncated joint is lower than that of non-truncated joints, and wherein the truncated joint is one that is outside an angle of view of the image of the target object;

generating a query pose from joints of the two-dimensional joint pose whose confidence scores are greater than or equal to the threshold;

obtaining a sample two-dimensional joint pose closest to the query pose from a database in which a plurality of sample two-dimensional joint poses is registered for each basic joint pose of a sample articulated object;

correcting the two-dimensional joint pose of the target object to a two-dimensional joint pose in which a truncated joint is complemented by replacing the joint whose confidence score is lower than the threshold with a corresponding joint of the sample two-dimensional joint pose closest to the query pose; and previous to the obtaining, registering in the database (1) three-dimensional pose data representing each basic joint pose of a sample articulated object and (2) two-dimensional pose data representing the plurality of sample two-dimensional joint poses, and associating the three-dimensional pose data and the two-dimensional pose data with each other, wherein the obtaining includes searching the database with the query pose.

5. A non-transitory computer-readable storage medium storing a joint pose estimation program comprising a plurality of instructions configured to cause at least one processor to execute:

estimating a two-dimensional joint pose of a target object from an image of the target object by using a model, the target object belonging to an articulated object represented by a plurality of joints, and the model being configured to output a two-dimensional joint pose of the articulated object and a confidence score of estimated position of each joint upon an input of an image of the articulated object;

removing a joint whose confidence score is lower than a threshold, wherein the confidence score calculated for a truncated joint is lower than that of non-truncated joints, and wherein the truncated joint is one that is outside an angle of view of the image of the target object;

generating a query pose from joints of the two-dimensional joint pose whose confidence scores are greater than or equal to the threshold;

obtaining a sample two-dimensional joint pose closest to the query pose from a database in which a plurality of sample two-dimensional joint poses is registered for each basic joint pose of a sample articulated object;

correcting the two-dimensional joint pose of the target object to a two-dimensional joint pose in which a truncated joint is complemented by replacing the joint whose confidence score is lower than the threshold with a corresponding joint of the sample two-dimensional joint pose closest to the query pose; and previous to the obtaining, registering in the database (1) three-dimensional pose data representing each basic joint pose of a sample articulated object and (2) two-dimensional pose data representing the plurality of sample two-dimensional joint poses, and associating the three-dimensional pose data and the two-dimensional pose data with each other, wherein the obtaining includes searching the database with the query pose.

6. The joint pose estimate system according to claim 4, wherein a basic joint pose most related to the query pose is obtained from the database.

7. The non-transitory computer-readable storage medium according to claim 5, further comprising obtaining a basic joint pose most related to the query pose from the database.

* * * * *